Oct. 4, 1938.   F. WAHLBERG   2,132,226
DEMONSTRATION MODEL
Filed Feb. 27, 1937
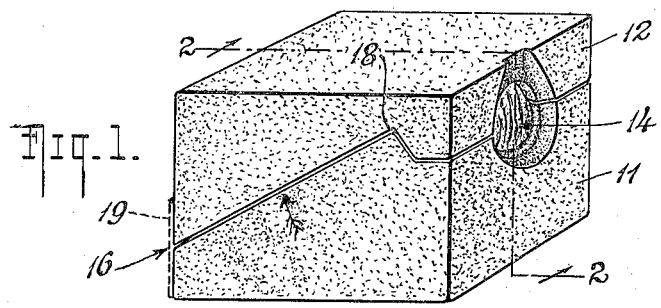
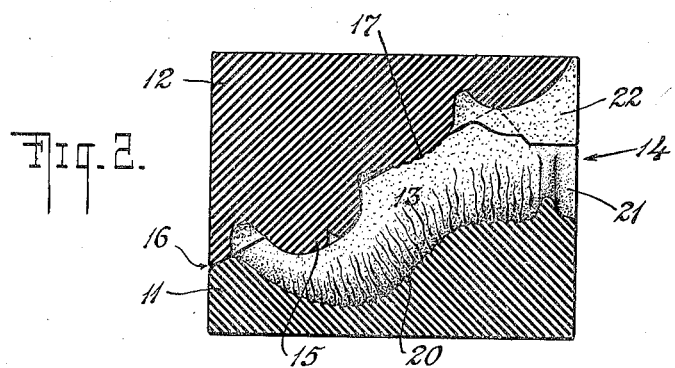
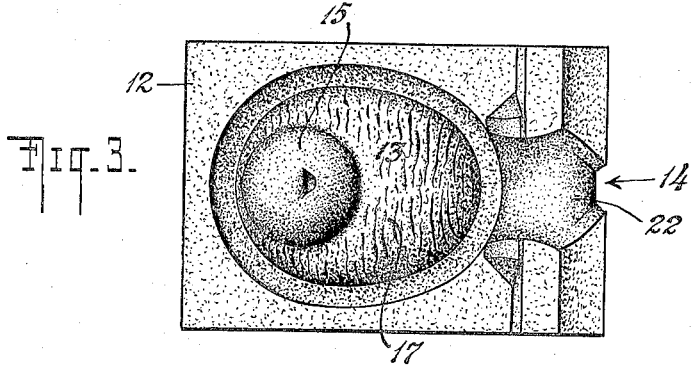
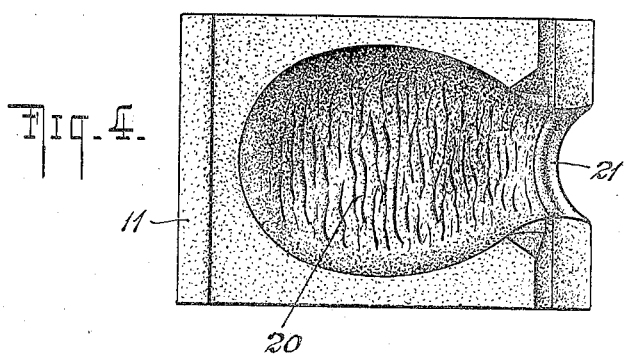
INVENTOR
FRANK WAHLBERG
BY
ATTORNEYS

Patented Oct. 4, 1938

2,132,226

UNITED STATES PATENT OFFICE 2,132,226

DEMONSTRATION MODEL

Frank Wahlberg, Brooklyn, N. Y., assignor to Durex Products, Incorporated, New York, N. Y., a corporation of New York Application February 27, 1937, Serial No. 128,142

7 Claims. (Cl. 35—17)

This invention relates to physiological or anatomical models, especially to such models made of fictile material and intended to simulate living tissues surrounding a cavity of the human body, and more particularly a model adapted to be used in demonstrating the physical characteristics of such structure and for demonstration and practice of, and instruction with respect to, operations corresponding in essential details to the modus operandi of such operations when performed upon living tissue.

Among the body cavities which present considerable difficulties to the convenient and practical demonstration of various operations, is the female pelvic cavity, and attempts have been made to supply a model of fictile material, such as sponge rubber, which will represent with some fidelity the physical characteristics of the living tissue at this region, and can be explored with less skill than that of a gynecologist.

Conventional models of this type are, however, subject to some of the inconveniences attending exploration of, and operations upon, the human body, especially in the respect that most of the organs to be treated are so occluded that the unskilled operator can derive but little effective instruction from the use of such a model, and only acquires a certain amount of skill and facility in operation after many ill-directed attempts, with attendant discouragement, due to the generally ineffective nature of the model and of the impractical technique, which persists to an inordinate extent.

Under such conditions, the general object of the present invention is to provide a novel type of physiological, anatomical or like model of the class above mentioned, made of resistantly yielding fictile material so constructed of separable elements that when the elements are assembled, they represent with adequate accuracy the selected cavity with its circumjacent tissue. They can be so used, accordingly, in that part of the instructive curriculum involving exploration of occluded organs and operations thereupon, which operations correspond in essential details with actual operations upon the human body; the component elements having, however, by virtue of their separable character, in pursuance of this invention, the novel and highly desirable property of permitting ready detachment of such parts of the elements as are unnecessary to the further demonstration or instructions, and which occlude, when present, the instruments, attachments and other devices by which the operation is implemented.

By such detachment and removal of the occluding parts, according to the invention, the locus of the operation is fully revealed, and the steps of an operation may be re-performed, in a manner which discloses to the pupil in an attention-arresting, and most instructive manner, the skilled technique of the instructor. The device of the present invention also furnishes to a novice the opportunity for practice of the instruction received, both in the assembled form of the model, which simulates the actual conditions encountered when operating upon an occluded organ, and in the separated form, where any mistake of procedure is at once made apparent, and can be corrected by careful repetition of the steps of the operation until the desired facility is acquired.

Another object of the invention is to provide such a model with separable elements of inexpensive structure, easy to manipulate, readily portable by a medical man or other instructor; which do not deteriorate in use or by reasonable lapse of time; and which are free from loose parts likely to be mislaid, and only require such intelligence and care in use as may be expected of pupils unfamiliar with the structure of the body.

Other objects and features of the invention will appear as the description of the particular physical embodiment selected to illustrate the invention progresses.

In the accompanying drawing, like characters of reference have been applied to corresponding parts throughout the several views which make up the drawing, in which:

Fig. 1 is a view in perspective of a physiological or anatomical model in the construction of which the present invention has been embodied;

Fig. 2 is a view of the same in vertical, sectional elevation, taken on the line 2—2 of Fig. 1;

Fig. 3 is a view of the upper element of the assembly, taken separately and viewed in the direction of the arrow, Fig. 1, i. e., perpendicular to the main plane of cleavage;

Fig. 4 is a like view of the bottom element taken separately, and viewed in a direction perpendicular to the main plane of cleavage; the said element being reversed, bottom for top.

In a now-preferred embodiment of the invention, the reference characters 11 and 12 respectively designate generally a bottom element and a top element, which, when assembled as shown in Fig. 1, constitute a model of a physiological or anatomical nature of part of the female pelvic cavity, and of the circumjacent living tissue, the material of the model preferably having the resistantly yielding property characteristic of sponge rubber.

The reference character 13 designates the vagina; 14 is the vaginal orifice, and 15, the cervix uteri. These parts are illustrated with substantial fidelity as to relative position and dimensions, but it has not been found necessary that the living original should be represented with meticulous detail in the model.

In pursuance of the invention, the element 12 is separable from the element 11 along the plane of cleavage indicated at 16 in Fig. 1, and this plane, while its position may be somewhat varied in practice, will be preferably so disposed as to provide for optimum revelation, when the element 12 is detached, of the organs which are occluded by the top element when in the assembled position.

In the instance illustrated, the bottom element 11 has been designed to include only the lower arcuate wall 20 of the vagina, and the communicating lower arcuate wall 21 of the vaginal orifice, so that upon removal of the element 12, substantially the entire overlying parts of the cavity are disclosed in the element 12, including the cervix 15, the upper arcuate wall 17 of the vagina, and the upper wall 22 of the orifice 14.

In order to provide for the above desirable division, the plane of cleavage 16 is not continuous, but is interrupted, preferably, as at 18, by a jog, (see Fig. 1), and this arrangement can be modified as found suitable or necessary; as for example, by dividing the model along a vertical plane of cleavage (not shown); or along any plane of cleavage at a desired angle to the base; or along more than one plane, so that the model will comprise more than two parts; if such division is of sufficient importance to require changes from the illustrated use of only two elements, which is preferable, for the sake of simplicity, etc.

When made in two parts, having the respective complemental contours shown, and of generally cubical exterior contour when assembled, it is found that the model is self-sustaining as a unitary structure, even without bands, or without any encasement, to hold the parts in assembled relation. Such bands or encasement may, however, be provided.

If desired, a hinge may be added, as for example by vulcanizing, or otherwise securing, a strip of suitable hinge material across the line of cleavage 16, as indicated by dotted lines at 19 in Fig. 1.

In operation, with the elements 11 and 12 occupying the assembled position shown in Fig. 1, the model affords substantially a replica of the pelvic cavity of the female human body, and may be used for any purpose for which such a model of conventional form is available.

An important intended use is in demonstration of the modus operandi followed in applying to the cervix a pessary, which operation will be accomplished in conventional or other suitable manner, and need not be detailed herein, except to point out that this operation can be accomplished with rapidly increased facility when practiced by means of the separable characeristic afforded by the removal of the top element 12.

If, for example, a pessary has been inserted, and an attempt made unsuccessfully to locate the cervix and apply the pessary thereto, the removal of the top element 12 will at once reveal the misapplication, and some indication of the reason therefor, and if the operation be repeated several times, the pupil will soon gain the requisite information as to the proper manipulation of the implement which will assure correct disposition of the pessary in its applied position, when the parts are occluded.

While the operation of emplacement of a pessary has been described by way of illustration, it will be understood that instruction and practice in the performance of other operations upon such occluded parts can be likewise effected in the simplest and most rapid manner by the use of a physiological or anatomical model embodying the invention herein disclosed, whether in the pelvic cavity or in some other cavity of the body.

I have described what I believe to be the best embodiments of my invention. I do not wish, however, to be confined to the embodiments shown, but what I desire to cover by Letters Patent is set forth in the appended claims.

I claim:

1. A physiological or anatomical model of an occluded cavity of the human body and its circumjacent tissues, said model comprising a pair of elements having the cavity wall portions, at least, composed of yieldable material, and adapted to be assembled, and having an orifice representing an orifice of the body affording access to body organs or parts confined within and bounding said cavity, said elements being separable to permit direct access to said normally occluded parts.

2. A physiological or anatomical model of the pelvic cavity of the female human body and its circumjacent tissues, said model comprising a plurality of elements having the cavity wall portions, at least, composed of yieldable material, and adapted to be assembled, and having portions of their walls shaped to represent the vagina and cervex uteri, and to represent a vaginal orifice affording access to said other represented parts; said elements being separable to permit direct access to certain of said represented parts.

3. A physiological or anatomical model of the pelvic cavity of the female human body and its circumjacent tissues, said model comprising a plurality of elements having the cavity wall portions, at least, composed of yieldable material, and adapted to be assembled, and having portions of their walls shaped to represent the vagina and cervex uteri, and to represent a vaginal orifice affording access to said other represented parts; said elements being separable to permit direct access to said cervical representation.

4. A physiological or anatomical model having the features claimed in claim 2, in which the plane of cleavage of said elements is disposed in horizontally longitudinal relation to the model, substantially medially with respect to said vaginal orifice, and completely clearing the cervical representation.

5. A physiological or anatomical model of the class described, said model having the features claimed in claim 1, in which said parts are interfitted to prevent casual displacement relatively to each other when assembled.

6. A model having the features claimed in claim 2, in which said orifice is adapted to permit insertion of a pessary and of a probe by which to locate the cervix and effect the emplacement thereon of said pessary, said elements being separable along a plane so disposed as to permit direct observation of said cervix, probe and pessary, to facilitate instruction in manipulation of the same.

7. A physiological or anatomical model having the features claimed in claim 1, in which said separable parts are hingedly connected.

FRANK WAHLBERG.